United States Patent Office 2,945,351
Patented July 19, 1960

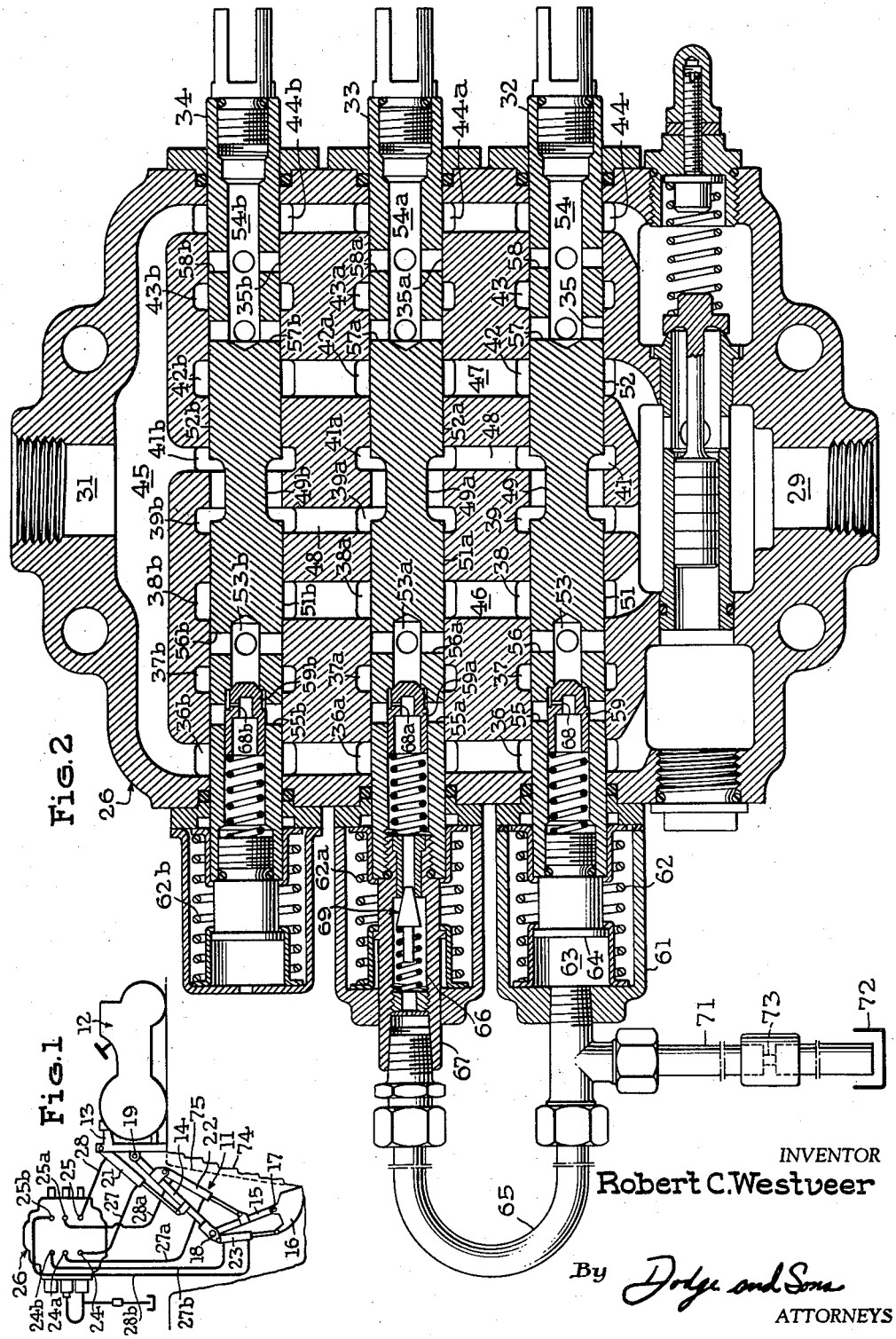

2,945,351

CONTROL VALVE

Robert C. Westveer, Kalamazoo, Mich., assignor to The New York Air Brake Company, a corporation of New Jersey Filed Apr. 22, 1959, Ser. No. 808,143

2 Claims. (Cl. 60—52)

This invention relates to control valves for use in those systems employing a pair of double-acting fluid pressure motors wherein one motor may be operated to relieve a stalled condition of the other.

A typical system of this type is the one used to control the "crowd" and "lift" motors of a backhoe. These systems usually include a pump, a sump and a pair of control valves, one of these valves being associated with and arranged to control each motor. The control valves are of the three-position type, that is, each includes a movable valve element having a first position in which it establishes a supply path between the pump and one side of the associated double-acting motor and an exhaust path between the other side of this motor and the sump, a second position in which these supply and exhaust paths are reversed, and a neutral position in which each side of the double-acting motor is isolated from the other side and from the pump and sump. For convenience in describing the invention, it will be assumed that the "lift" and "crowd" motors move in bucket-lifting and bucket-filling directions, respectively, when the associated control valves are in their first positions.

In the course of digging a ditch with a backhoe, it is possible, either by reason of the nature of the soil or by reason of the size of the bite which the bucket is taking, to stall the "crowd" motor. When this happens, the operator shifts the movable element of the "lift" motor control valve to the first position to operate that motor in a bucket-lifting direction and relieve the load on the "crowd" motor. When the stalling condition is relieved and the "crowd" motor once again moves the bucket in the bucket-filling direction, the operator returns the "lift" valve to neutral position. Repeated operation of this kind is not only time consuming but leads to operator fatigue.

The object of this invention is to provide a device for performing this stall-relieving function auotmatically and without precluding overriding control of the "lift" valve by the operator. According to the invention, the movable element of the "lift" motor control valve is biased by a spring to its neutral position and is shifted from this position to the first or motor-lifting position by a piloted pressure motor. The working chamber of this piloted pressure motor communicates with a pilot passage which connects the supply path established in the first position of the "crowd" motor control valve with the sump. Flow through the pilot passage is controlled by a relief valve which is located upstream of the connection with the working chamber and the pilot pressure for operating the pilot motor is developed by a flow restriction which is positioned downstream of the junction between the pilot passage and the working chamber. When the "crowd" motor is moving in the bucket-filling direction and encounters a stalling load, the pressure in the supply path rises and causes the relief valve to open. When this happens, fluid flows through the pilot passage and the flow restriction creating a back pressure which is effective in the working chamber to cause the piloted motor to shift the "lift" valve to its first position against the bias of the resilient means. The bucket is lifted until the pressure in the "crowd" motor decreases below the cracking pressure of the relief valve. When the relief valve closes, the pressure in the working chamber bleeds off through the flow restriction and the resilient biasing means returns the "lift" valve to neutral position.

Since the shifting force produced by the piloted pressure motor need only be great enough to overcome the bias of the resilient means, the operator can easily override the automatic control and hold the movable element of the "lift" valve in neutral position. Furthermore, since the pilot passage is disconnected from the "crowd" motor when the "crowd" control valve is in neutral position, the hydraulic lock normally produced by this position is not impaired. These two features are important when forming straight-sided ditches.

The preferred embodiment of the invention will now be described in relation to the accompanying drawing, in which:

Fig. 1 is a schematic diagram showing a simplified backhoe system in which the control valve is used.

Fig. 2 is a sectional view of a multi-plunger open-center parallel connected control valve incorporating the invention.

As shown in Fig. 1, the backhoe 11, which is mounted on the rear of tractor 12, comprises a main frame 13, a main boom 14, a bucket boom 15, and a bucket 16; the bucket 16 being pivotally connected to the bucket boom at 17, the bucket boom being pivotally connected to the main boom at 18, the main boom being pivotally connected to the main frame at 19, and the main frame being rigidly connected to the tractor. Three double-acting piston motors 21, 22 and 23, which are pivotally connected at their opposite ends with the associated backhoe elements, serve to "lift," "crowd," and "tilt" bucket 16. The opposite sides of these three motors 21, 22 and 23 are connected to the motor ports 24, 25, 24a, 25a, and 24b, 25b of control valve 26 by conduits 27, 28, 27a, 28a, and 27b, 28b, as shown. The valve 26 is capable of operating any one of the motors independently or any two or more together and in parallel.

The control valve 26, shown in Fig. 2, is of the conventional open-center parallel type having inlet and exhaust ports 29 and 31, respectively, and employing three hollow control plungers 32, 33 and 34. Since the valving functions performed by these plungers are identical, only the plunger 32 and its associated chambers will be described in detail.

Plunger 32 is slidable in a through bore 35 formed in the valve housing and encircled by eight spaced annular chambers 36 to 39 and 41 to 44. The chambers 36 and 44 are connected with exhaust port 31 by an exhaust manifold 45, and the chambers 38 and 42 are connected with inlet port 29 by supply manifolds 46 and 47, respectively. An unloading passage 48 extends through the housing between inlet port 29 and exhaust manifold 45 and intersects annular chambers 39 and 41. The annular chambers 37 and 43 communicate with motor ports 24 and 25, respectively.

The valve plunger 32 is formed with an annular groove 49 which defines two spaced valve lands 51 and 52. Extending inward from opposite ends of the plunger are two axial bores 53 and 54 whose outer ends are closed and sealed by plugs, as shown. The bore 53 is intersected by two spaced sets of radial passages 55 and 56 and the bore 54 is intersected by two similar sets of passages 57 and 58. A conventional check valve 59 is positioned in bore 53 for preventing reverse flow from passages 55 to passages 56. Radial passages 55 to 58 are so located that when the plunger 32 is in the neutral position (shown in Fig. 1), the land 51 isolates chamber 37 from chambers 36 and 38 and the land 52 isolates chamber 43 from chambers 42 and 44. When the plunger is shifted to the right to the bucket-lifting position, passages 55 and 56 connect annular chamber 37 with annular chamber 38 and passages 57 and 58 connect annular chamber 43 with annular chamber 44. When the plunger 32 is shifted to the left to bucket-lowering position, passages 55 and 56 connect annular chamber 37 with annular chamber 36, and passages 57 and 58 connect annular chamber 43 with annular chamber 42.

The left end of plunger 32 is enclosed by a sealed cap 61 within which is located a centering spring 62 that biases the plunger to the neutral position. The sealed space 63 within cap 61 constitutes the working chamber of a piloted pressure motor whose movable element is defined by the end 64 of plunger 32. This working chamber is connected by a flexible conduit 65 with an axial bore 66 formed in an extension 67 of "crowd" plunger 33. The bore 66 communicates with radial passages 55a through bore 53a and the radial passages 68a formed in check valve 59a. Flow through the bore 66 is controlled by a relief valve 69. Intersecting the conduit 65 is an exhaust line 71 which communicates with sump 72 and contains a flow restriction 73. This restriction is so selected that the back pressure it produces is sufficient to cause the piloted pressure motor 63, 64 to shift plunger 32 to the bucket-lifting position against the bias of centering spring 62.

*Operation*

In use, inlet port 29 is connected with a pump (not shown), exhaust port 31 is connected with sump 72, and the motor ports 24, 25, 24a, 25a, and 24b, 25b are connected with the opposite side of motors 21, 22 and 23, respectively. When the valve plungers 32, 33 and 34 are in neutral position, lands 51, 52, 51a, 52a, and 51b, 52b isolate annular chambers 37, 43, 37a, 43a, and 37b, 43b, respectively, thereby hydraulically locking motors 21, 22 and 23. At this time, inlet port 29 is in free communication with exhaust port 31 through the unloading passage 48 so the pump is unloaded.

Bucket 16 is lifted by shifting plunger 32 to the right from the neutral position so that a supply path is established between inlet port 29 and the rod end of motor 21 through supply manifold 46, annular chamber 38, radial passages 56, bore 53, check valve 59, radial passages 55, annular chamber 37, motor port 24, and line 27, and an exhaust path is established between the piston end of that motor and sump 72 through line 28, motor port 25, annular chamber 43, radial passages 57, bore 54, radial passages 58, annular chamber 44, exhaust manifold 45, and exhaust port 31. Simultaneously, land 51 isolates annular chamber 39 from annular chamber 41 thereby closing unloading passage 48 and loading the pump. The pressure differential acting on the piston of motor 21 will cause it to rotate main boom 14 in a clockwise direction about pivot 19 and raise bucket 16.

In order to lower bucket 16, plunger 32 is shifted to the left from neutral position so that radial passages 55 and 56 and bore 53 connect annular chamber 37 with the exhaust port 31 through annular chamber 36 and exhaust manifold 45, and radial passages 57 and 58 and bore 54 connect annular chamber 43 with inlet port 29 through annular chamber 42 and supply manifold 47. In this position, land 52 closes the unloading passage 48.

The plunger 33 operates "crowd" motor 22 in the same manner; the motor 22 rotating bucket boom 15 in the counterclockwise direction about pivot 18 to fill the bucket 16 when plunger 33 is shifted to the operative position on the right side of neutral, and rotating the boom in the opposite direction when the plunger 33 is shifted to the operative position on the left side of neutral. If, when plunger 33 is in the right operative position, the load on the bucket becomes excessive, motor 22 will stall and the pressure in line 27a, motor port 24a, and annular chamber 37a will rise. In response to this increase in pressure, relief valve 69 will open and permit fluid to flow from chamber 37a to sump 72 through passages 55a and 68a, bores 53a and 66, conduit 65, exhaust line 71, and flow restriction 73. The back pressure produced in conduit 65 by restriction 73 is transmitted to working chamber 63 where it acts upon the end 64 of plunger 32 and shifts that plunger to the right against the bias of spring 62 to the bucket-lifting position. This opens a supply path between inlet port 29 and the rod end of motor 21 and an exhaust path between the piston end of motor 21 and exhaust port 31 thus causing motor 21 to lift bucket 16. When the bucket reaches a level at which the load is no longer excessive, "crowd" motor 22 will commence to move thereby reducing the pressure in bore 66. As a result, relief valve 69 will close, the pressure in working chamber 63 will bleed off through exhaust passage 71, and centering spring 62 will return plunger 32 to neutral position thus stopping and locking "lift" motor 21. In the course of digging a ditch such as the one shown in Fig. 1, repeated automatic operation of the "lift" motor in this manner produces a stepped side wall as illustrated by the solid line 74 in Fig. 1.

It should be observed that when "crowd" plunger 33 is in neutral position, land 51a isolates annular chamber 37a from bore 66 and therefore the pressure in the rod end of motor 22 does not act on relief valve 69. Because of this, external loads acting on bucket 16 cannot cause movement of bucket boom 15. This feature is desirable when forming a straight-walled ditch (such as the one illustrated by the dashed line 75 in Fig. 1).

It should also be noted that the pressure for operating the piloted pressure motor 63, 64 connected with plunger 32 is the back pressure created by restriction 73 and need only be sufficient to overcome the force of centering spring 62. Thus, at any time, the operator may override the automatic control simply by exerting a neutralizing force on plunger 32 slightly greater than that which is usually required to shift the plunger against the bias of spring 62.

As stated previously, the drawings and description relate only to a preferred embodiment of the invention. Since many changes can be made in the structure of this embodiment without departing from the inventive concept, the following claims should provide the sole measure of the scope of the invention.

What is claimed is:

1. In a hydraulic control system for two double-acting fluid pressure motors which are connected with a controlled apparatus that imposes stalling loads on the first motor when that motor is operated in a certain direction and in which the motors are so arranged that operation of the second motor in a certain direction relieves the stalled condition of the first motor, and which includes a pump, a sump, and two control valves, one for controlling each motor, and each including a movable element having a first position in which it establishes a supply path between the pump and one side of the motor and an exhaust path between the other side of the motor and the sump, a second position in which these supply and exhaust paths are reversed, and a neutral position in which each side of the motor is isolated from the other side and from the pump and sump, and in which the motors are operated in said certain directions when the movable valve elements are in their first positions, the improvement which comprises resilient means biasing the movable element of the second motor control valve to its neutral position; a piloted pressure motor having a working chamber and a movable member subject to the pressure in that chamber and connected with the movable element of the second motor control valve for shifting that element to its first position against the bias of the resilient means; a pilot passage connecting the working chamber with the supply path established in the first position of the movable element of the first motor control valve; a relief valve located in and controlling flow through the pilot passage; and a restricted exhaust passage connecting the sump with a point in the pilot passage between the relief valve and the working chamber.

2. In combination, first and second control valves, each having a housing containing an inlet port, an exhaust port, and two motor ports, and a movable element carrying valve heads which cooperate with seats in the housing to control communication between said ports, each movable element having a first position in which it establishes a supply path between one motor port and the inlet port and an exhaust path between the other motor port and the exhaust port, a second position in which these supply and exhaust paths are reversed, and a neutral position in which each motor port is isolated from the other three ports; resilient means biasing the movable element of the first valve to neutral position; a piloted pressure motor having a working chamber and a movable member subject to the pressure in that chamber and connected with the movable element of the first valve for shifting that element to its first position against the bias of the resilient means; a pilot passage connecting one of the supply paths established by the movable element of the second valve with the working chamber; a relief valve located in and controlling flow through the pilot passage; and a restricted exhaust passage connected with the pilot passage at a point between the relief valve and the working chamber.

References Cited in the file of this patent
UNITED STATES PATENTS

| | | |
|---|---|---|
| 2,856,960 | Stacey | Oct. 21, 1958 |
| 2,857,009 | Adams et al. | Oct. 21, 1958 |
| 2,890,805 | Pilch | June 16, 1959 |